United States Patent Office 2,828,184
Patented Mar. 25, 1958

2,828,184

PREPARATION OF ALKALI METAL OR ALKALI EARTH METAL IODATES AND IODIDES

Abraham Sidney Behrman, Chicago, Ill.

No Drawing. Application April 13, 1954
Serial No. 422,974

21 Claims. (Cl. 23—85)

This invention relates to the preparation of halogen compounds. It is concerned more particularly with the preparation of halogenates and halides, and specifically with the preparation of iodates and iodides.

A principal object of the invention is a new process for the economical production of water-soluble iodates and iodides.

Another object of the invention is a new and economical method for the reduction of iodates to iodides.

A further object of the invention is a new process for preparing solid iodides of high purity by direct drying of a solution of the iodide without the necessity of fractional crystallization and separation from mother liquor.

Still another object of the invention is a "wet method" for preparing iodides which utilizes such highly concentrated reacting solutions and reaction mixtures that the volumes of solutions and mixtures are kept to a minimum, resulting in marked economies in processing and handling costs.

The attainment of these and other objects of the invention will become apparent on the further reading of this specification and of the claims.

The commercial and economic importance of the water-soluble iodides is so well understood that no extended discussion of this point is required. Large quantities of potassium and sodium iodide, for example, are employed, in foods and feeds, photographic materials, medicinal preparations, and other products.

Until recently, there has been no large-scale use for the iodates, although potassium iodate and sodium iodate are standard laboratory reagents in chemical analysis, and are also recommended in a limited way as therapeutic agents. Very recently, however, it has been found that the iodates are very stable sources of iodine when used in "iodized salt" for human consumption and in "salt blocks" for animal feeds, even under adverse conditions of climate and humidity and of quality of the salt. It may be expected, therefore, that the demand for the iodates will increase rapidly for these purposes, in view of the difficulties and/or expense involved in the use of alternative materials, as, for example, organic iodine compounds.

Even with the anticipated increased demand for the iodates in foods and feeds, however, the many large-scale uses of the iodides will continue to provide much larger markets for the latter. This fact is of special interest in connection with the present invention, which provides in a single process for the preparation of an appreciable but minor proportion of iodate and a much larger proportion of iodide.

The present methods of preparation of the iodides, as commonly practiced, are cumbersome and expensive. Potassium iodide, for example, is usually prepared by one of two procedures. In one method, iodine is dissolved in a solution of potassium hydroxide or carbonate, and the solution is evaporated to dryness. The dry residue is mixed with powdered carbon, and the mixture heated in a furnace to effect reduction of the iodate. The resultant mass is extracted with water, and potassium iodide recovered by crystallization from this solution. In the so-called "wet method," as described by J. Mellor in his "Modern Inorganic Chemistry," eighth edition, page 322, iodine and iron are reacted in the presence of water to form ferrous iodide. To the decanted solution is added more iodine to convert the ferrous iodide to ferric iodide. This solution is then reacted with potassium hydroxide or carbonate. A large volume of ferric hydroxide is precipitated, and potassium iodide remains in solution. Experience has shown that the washing of this voluminous precipitate of ferric hydroxide is a lengthy and awkward process, and that the evaporation of the large volume of wash water required adds materially to the cost of preparation.

The methods for preparing iodates which are in use or which have been proposed cannot be considered economical or efficient. The electrolytic method, for example, is open to the objection of cost of special equipment and of operation. The chemical methods, such as, for example, the classical preparation from iodine and potassium chlorate, usually involve several separations which are both costly and time-consuming.

Quite in contrast to such methods, the process of my invention is characterized by the ease and economy with which the iodates are prepared and recovered. This fact will become apparent from the description of the process which follows:

In essence, the process of my invention in preferred form comprises reacting elemental iodine and an alkali in the presence of water to form a reaction mixture of such high concentration that most, or at least a substantial part of the iodate formed is precipitated and recovered. The iodate remaining dissolved in the solution, now containing mostly the iodide, is reduced to the iodide by means of an amphoteric metal taken from the group consisting of aluminum and zinc. Both the original reaction and reduction may be efficiently performed without the application of heat. Any aluminate or zincate remaining in the solution after reduction may be decomposed, if desired, by adding sufficient acid, preferably hydriodic acid, to reduce the pH of the solution to the isoelectric or minimum solubility range of aluminum hydroxide or zinc hydroxide respectively. The precipitated amphoteric hydroxide is separated from the solution, which may then be evaporated to dryness, if desired, for recovery of the iodide. If raw materials of proper purity—now readily available commercially—are employed, the product obtained on evaporation of the solution directly to dryness, without partial crystallization and separation of mother liquor, will assay well over 99 percent in iodide content.

The iodate which has been separated from the original reaction mixture, and which contains occluded iodide as the principal impurity, may be washed with a relatively small volume of saturated iodate solution to leave a product typically assaying more than 99 percent in iodate content. The spent iodate wash solution may be used in making up a fresh batch of reaction mixture, or it may be treated with aluminum or zinc to reduce the iodate to iodide which may then be recovered; the former procedure will generally be found preferable, particularly when maximum recovery of iodate is desired, since by this procedure an essentially closed system may be maintained and all the iodate formed may be recovered as such with the exception, of course, of that iodate in the solution separated from the precipitated iodate of the original reaction mixture which is recovered in the form of iodide.

An important factor contributing to the commercial success of the process of my invention is my discovery that the reduction of iodate to iodide may be accomplished by aluminum or zinc, and especially readily by aluminum, in substantially neutral, or only faintly alkaline solution, instead of in the presence of the considerable excess of alkali generally considered essential for non-acidic reductions with these metals. The advantageous results of this discovery are threefold: (1) Less aluminate or zincate remains in solution after reduction; (2) less hydriodic acid is required for neutralization of the solution to the pH range of minimum solubility of the amphoteric hydroxide; and (3) less amphoteric hydroxide is precipitated, thus minimizing or even practically eliminating the washing required to prevent loss of iodide from this source.

Another advantageous feature of my invention is the high percentage of iodate I am able to recover. The solubility of iodates in water is characteristically much less than that of the corresponding iodides. I may take advantage of this relationship by working with highly concentrated solutions; in fact, as will be seen in the examples given below, I may employ proportions of reagents which will yield solutions of iodides which are just safely short of saturation. As a result, the common ion effect may be utilized to the greatest practical extent to induce maximum precipitation of the iodate formed in the reaction.

Another very important advantage in producing such highly concentrated solutions of the iodide end-products is that the amount of water to be evaporated to produce the final, dried product is extremely small. In the case of potassium iodide, for example, the amount of water to be evaporated may be as little as about one pound or even less of water per pound of bone-dry potassium iodide.

In the preparation of potassium iodate and iodide, for example, the reaction between iodine and potassium hydroxide (in aqueous solution) is generally assumed to take place in two steps:

$$3I_2 + 6KOH \rightarrow 3KI + 3KIO + 3H_2O \quad (1)$$

$$3KIO \rightarrow KIO_3 + 2KI \quad (2)$$

Adding the above two equations:

$$3I_2 + 6KOH \rightarrow 5KI + KIO_3 + 3H_2O \quad (3)$$

It will thus be seen that, of the iodine taking part in these reactions, theoretically one-sixth is converted to the iodate. In the process of my invention, using the high concentrations of reactants I prefer to employ, I am frequently able to recover in dry, substantially pure form about 82 percent of the theoretical yield of iodates even on a "once-through" basis, that is, without cylic re-use of the spent iodate wash solution to make up a fresh reaction mixture; and, when the spent iodate wash solution is employed in the preparation of a fresh portion of reaction mixture, the iodate recovery may be about 90 percent or slightly higher. In either case, the iodate not recovered as such is not lost, of course, but is reduced to and recovered as the iodide.

The characteristic relative solubilities of the iodate and iodide previously mentioned make my invention generally applicable to the preparation and recovery of water-soluble iodates and iodides, particularly of those metals whose alkaline compounds are also water-soluble. Included therefore will be primarily iodates and iodides of the alkali metals and of the alkaline earth metals.

The underlying principles of my invention will now be demonstrated and elaborated by the following illustrative examples.

*Example 1.—Preparation of potassium iodate and iodide*

Ten thousand parts by weight of elemental iodine are reacted with 4410 parts potassium hydroxide (100 percent KOH basis) in aqueous solution containing about 441 grams KOH per liter. The potassium hydroxide solution may be prepared conveniently either from the 90 percent solid material or the 45 percent solution now commercially available. Addition of the iodine usually results in a temperature increase of about 25 to 30° C. A heavy white precipitate of potassium iodate is formed and settles rapidly. After standing long enough for the formation of the iodate and settling of the precipitate to be substantially complete (as, for example, several hours or, conveniently, over night) the precipitated potassium iodate is filtered off. The filtrate, a highly concentrated solution of potassium iodide saturated with iodate, is now reduced in a suitable vessel with metallic aluminum, preferably aluminum foil or other form of aluminum having a large amount of surface per unit weight. A considerable excess of aluminum is desirable to facilitate the reduction; in fact, the liquid volume may be more or less filled with particles of aluminum. The reduction may be accompanied by an appreciable temperature rise.

Reduction by means of aluminum in alkaline solution is generally assumed to be by the hydrogen evolved in the typical reaction depicted by this equation:

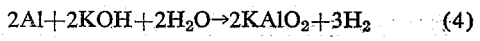
$$2Al + 2KOH + 2H_2O \rightarrow 2KAlO_2 + 3H_2 \quad (4)$$

If this theory of the reduction mechanism is accepted, the second step in the reduction of iodate to iodide would be:

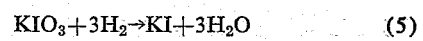
$$KIO_3 + 3H_2 \rightarrow KI + 3H_2O \quad (5)$$

It is not difficult to accept the above theory and mechanism when working in strongly alkaline solutions. In the reduction of iodate to iodide, however, working with aluminum and zinc, and particularly with aluminum, I have found it possible to effect this reduction with such negligible excesses of alkali that they would be used up as such in the reaction shown by Equation 4 above long before the reduction was completed. In fact, where time is not important, I have found it possible to effect reduction of the iodate to iodide in a solution actually acid to phenolphthalein indicator but alkaline to methyl orange indicator; in such cases the amount of dissolved aluminum hydroxide is frequently so nearly zero that it may be ignored completely.

In all cases of the negligible excesses of alkali mentioned in the preceding paragraph, it seems to me to be more reasonable to assume that these almost trace amounts of alkali function more or less as catalysts, providing a small rotating supply of hydroxyl ions in the basic reaction shown by the following equation:

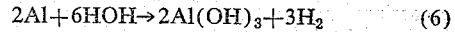
$$2Al + 6HOH \rightarrow 2Al(OH)_3 + 3H_2 \quad (6)$$

It is entirely consistent with the above concept to assume that a trace amount of excess alkali may form an aluminate and hydrogen as shown in Equation 4, but that the aluminate breaks down quickly to re-form the alkali as shown by the following equation:

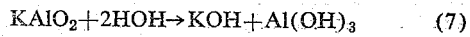
$$KAlO_2 + 2HOH \rightarrow KOH + Al(OH)_3 \quad (7)$$

Whether this theory be correct or not—and I am obviously not bound or limited by its correctness—the fact remains that for the first time, to the best of my knowledge, the reduction of iodate in solution to iodide has been accomplished with aluminum and zinc, and especially readily with aluminum, with the aid of such minute amounts of alkalinity that for many purposes they and their residual dissolved reaction products, if any, may be ignored.

In the present example, however, the proportions of potassium hydroxide and iodine are such as to leave in the reduced solution a perceptible though minute amount of potassium aluminate; and, assuming that it is desired to prepare potassium iodide of U. S. P. grade by direct evaporation to dryness, it is considered desirable to remove the dissolved alumina from the solution. Accordingly, the reduced solution, which typically may have a pH of about 9 to 10.5, is neutralized with hydriodic acid to the minimum solubility range of aluminum hydroxide, which is usually taken to be from about pH 5.3 to about 8.0. I have found a pH range of about 6.0 to 6.5 especially useful. I prefer to prepare as required the hydriodic acid used for pH adjustment by hydrogen exchange treatment of a solution of potassium iodide, as, for example, by passing an approximately N/1. solution of potassium iodide through a bed of a sulfonated polystyrene cation exchange resin, such as "Dowex 50," manufactured by the Dow Chemical Co., Midland, Michigan, which has been regenerated with sulfuric or hydrochloric acid and washed with water until substantially free of sulfates or chlorides. This procedure has three advantages: (1) By preparing the acid as required and using it promptly, the rapid oxidation which is characteristic of this acid is avoided and the presence of preservative chemicals found in commercial solutions of hydriodic acid is therefore eliminated; (2) if hydrogen exchange of the potassium iodide happens not to be complete, the "leakage" of unconverted potassium iodide into a solution of potassium iodide obviously introduces no contaminant; and (3) this method of preparing hydriodic acid is very economical, particularly since the potassium iodide used in its preparation may be taken in solution form from an appropriate point in the process, thus further increasing the cyclic nature and economy of the process.

The very small amount of aluminum hydroxide which is precipitated as a result of this pH adjustment is readily filtered off. The resultant filtered solution will typically have a specific gravity of about 1.60 to 1.65 at 20° C. and will contain about 850 to 900 grams potassium iodide per liter of solution. If relatively pure starting materials have been employed in the preparation, this final solution is a substantially pure solution of potassium iodide and may be evaporated to dryness—that is, without partial crystallization and separation of crystals from mother liquor—to produce a dried product meeting all the requirements of U. S. P. grade including that of a minimum assay of 99 percent KI. The stability of the dried product may be increased, if desired, by adding to the solution before or during evaporation a small amount of potassium hydroxide or other potassium alkali, such that, for example, a solution of 10 grams of the dried product in 10 ml. of boiled distilled water will have a phenolphthalein alkalinity of 2 drops (0.1 ml.) of normal sulfuric or hydrochloric acid.

The potassium iodate separated from the original reaction mixture may be washed with a relatively small volume of water, or preferably of saturated potassium iodate solution to displace occluded potassium iodide solution. I have found it readily possible in this way to produce a potassium iodate, which, after direct evaporation to dryness, will assay well over 99 percent $KIO_3$. The spent iodate wash solution may be treated with aluminum (or zinc) to reduce any iodate present to iodide, and the iodide subsequently recovered; or, more conveniently, the spent iodate wash solution may be used in the preparation of a new batch of reaction mixture, in which case, as has previously been pointed out, the yield of iodate recovered is appreciably increased, since in this way substantially all the iodate formed in the original mixture may be recovered as precipitate formed in the reaction mixture except, of course, that which is converted to the iodide in the filtrate from the precipitated iodate. The precipitated and washed iodate may be further purified, if desired, by dissolving in hot water, filtering, and evaporating to dryness. If extreme purity is required, as, for example, for analytical reagent grade, partial crystallization and separation of mother liquor may of course be practiced.

*Example 2.—Sodium iodate and iodide*

Ten thousand parts by weight of elemental iodine were reacted with 3460 parts by weight of sodium hydroxide of about 97 percent purity (the impurities being mostly water) dissolved in aqueous solution containing about 346 grams of the 97 percent sodium hydroxide per liter. A heavy white precipitate of sodium iodate resulted. After standing overnight, the precipitated sodium iodate was filtered off, washed with a saturated solution of sodium iodate until substantially free from sodium iodide, and dried. The spent sodium iodate wash solution was used to make up a fresh batch of reaction mixture. The original filtrate from the precipitated sodium iodate, consisting essentially of a highly concentrated solution of sodium iodide saturated with sodium iodate, was reduced with metallic aluminum according to the procedure described in Example 1. The reduced solution was separated from the residual aluminum and other solid particles, neutralized with hydriodic acid to the pH range of minimum solubility of aluminum hydroxide, separated from the precipitated aluminum hydroxide, stabilized by the addition of a very small amount of sodium hydroxide, and evaporated to dryness.

*Examples 3 and 4.—Use of zinc as reducing agent*

The preparations described in Examples 1 and 2 were repeated by the procedures described above, except that zinc was used instead of aluminum to reduce the iodate in the solution separated from the precipitated iodate. The zinc was used in the form of very thin sheet cut into small strips and bent into random shapes providing large surface per unit weight. The reducing action of the zinc was found to be characteristically slower than that of aluminum. The pH of the reduced solution was adjusted, when required, with hydriodic acid to the range of minimum solubility of zinc hydroxide, that is, the range of about pH 7 to about 12.5.

*Example 5.—Preparation of barium iodate and iodide*

Six hundred twenty parts by weight $Ba(OH)_2 \cdot 8H_2O$ were dissolved in 1000 parts by weight of water and reacted with 500 parts by weight of elemental iodine. A heavy white precipitate of barium iodate resulted. This was filtered off, washed, and recovered, and the original filtrate from the precipitated barium iodate was treated with metallic aluminum to reduce the small amount of dissolved barium iodate to iodide, in accordance with the general procedures described in Examples 1 and 2. Similarly, the pH of the reduced solution was adjusted with hydriodic acid, the precipitated aluminum hydroxide filtered off, and the barium iodide recovered, following the methods set forth in those examples.

It will be noted that in the above examples the elemental iodine has generally been added to the solution of the alkali. This sequence is not mandatory, since the alkali in solid form may be added to a mixture of the iodine and water; as the reaction proceeds, more and more of the iodine goes into solution.

Again, in the examples, the alkali used has been the hydroxide. Other soluble alkaline compounds, such as the carbonates, may also be employed to dissolve the iodine, and this solution may be reduced with aluminum or zinc and subsequently treated, when desired, according to the principles of my invention as previously set forth; but I have found these alternative alkalis unsatisfactory where precipitation and recovery of the iodate are important.

Even where recovery of the iodate as such is not desired, and where the iodide is the only desired end product, I have found the use of the hydroxide preferable. In fact, the preparation of the iodide alone by the processes of my invention is an important and economical operation as can readily be seen from the following summarizing equation:

$$3I_2 + 6KOH + 2Al \rightarrow 6KI + 2Al(OH)_3 \qquad (8)$$

From this equation it is apparent that the preparation of 1000 pounds of potassium iodide will require only about 55 pounds of aluminum when used in the processes of my invention.

In such cases where the production of iodide is the primary objective, I may proceed according to the general principles illustrated in the examples, starting with a somewhat more dilute reaction mixture in order to yield after reduction a solution of the iodide having a concentration about the same as that obtained when the precipitated iodate was separated. In Examples 1 to 4 inclusive, for example, this extra dilution may be effected by increasing the volume of the alkali metal hydroxide solution about 25 percent without increasing the weight of the dissolved hydroxide. The metallic aluminum or zinc may be added to the reaction mixture as soon as the reaction is substantially complete. To facilitate solution and reduction of the precipitated iodate, I have found it desirable to provide for agitation of the reaction mixture and metal, especially until all the iodate has been dissolved.

While the process of my invention has been described in general and in the examples as a batch process, it is obvious that on a large scale the method lends itself to a continuous system, particularly in the original reaction and reduction steps.

Since the aluminates and zincates tend to form unstable solutions of the amphoteric hydroxides, I have found it possible in some cases to reduce the amount of amphoteric hydroxide in alkaline solution, without pH adjustment, by agitating the solution in contact with solid particles of the appropriate amphoteric hydroxide or oxide, as, for example, with activated alumina in the case of dissolved aluminum hydroxide.

Other ramifications and modifications of my invention will suggest themselves to one skilled in the art and are deemed to be comprehended within the scope of my invention as limited by the claims.

I claim:

1. A process for preparing iodates and iodides which comprises reacting elemental iodine with a water-soluble hydroxide selected from the group consisting of the water-soluble alkali metal and alkaline earth metal hydroxides in substantially stoichiometric proportions so as to produce a substantially neutral reaction mixture and in sufficiently concentrated aqueous solution to precipitate a substantial quantity of the iodate formed in the reaction, separating the precipitated iodate from the solution, reducing the iodate in the iodide-iodate solution to iodide with an amphoteric metal selected from the group consisting of aluminum and zinc, and recovering the iodide from the solution.

2. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction and in proportions producing a substantially neutral reaction mixture, separating the precipitated iodate from the solution, reducing the iodate in the iodide-iodate solution to iodide with an amphoteric metal selected from the group consisting of aluminum and zinc, separating residual solid particles from the solution, and recovering the iodide from the solution.

3. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction and in substantially stoichiometric proportions producing a reaction mixture alkaline to phenolphthalein indicator, separating the precipitated iodate from the solution, reducing the iodate in the iodide-iodate solution to iodide with an amphoteric metal selected from the group consisting of aluminum and zinc, separating residual solid particles from the solution, adding to the solution an amount of acid sufficient to reduce the pH to the range of minimum solubility of the amphoteric hydroxide, separating precipitated amphoteric hydroxide from the solution, and recovering the iodide from the solution.

4. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction and in substantially stoichiometric proportions producing a reaction mixture alkaline to phenolphthalein indicator, separating the precipitated iodate from the solution, reducing the iodate in the iodide-iodate solution to iodide with an amphoteric metal selected from the group consisting of aluminum and zinc, separating residual solid particles from the solution, adding to the solution an amount of acid sufficient to reduce the pH to the range of minimum solubility of the amphoteric hydroxide, separating precipitated amphoteric hydroxide from the solution, and evaporating the solution to dryness.

5. A process according to claim 3, in which the acid used for adjusting the pH of the reduced solution is hydriodic acid.

6. A process according to claim 5, in which the hydriodic acid is produced by hydrogen exchange treatment of a solution of the iodide being prepared.

7. A process according to claim 1 in which the precipitated iodate is washed with a saturated solution of the iodate until the precipitate is substantially free from iodide.

8. A process according to claim 7 in which the iodate in the spent iodate wash solution is reduced to iodide by contacting the solution with an amphoteric metal selected from the group consisting of aluminum and zinc.

9. A process according to claim 7 in which the spent iodate wash solution is employed in the preparation of a new reaction mixture.

10. A process according to claim 3 in which, after separation of precipitated amphoteric hydroxide from the solution, an amount of alkali is added to the solution effective to stabilize the iodide against oxidation.

11. A process according to claim 3 in which the iodate and iodide are potassium iodate and iodide.

12. A process according to claim 3 in which the iodate and iodide are sodium iodate and iodide.

13. A process according to claim 5, in which the amphoteric metal utilized for the reduction is aluminum, and in which pH adjustment is to the pH range of about 5.3 to 8.0.

14. A process according to claim 5 in which the amphoteric metal utilized for the reduction is zinc, and in which pH adjustment is to the pH range of about 7 to 12.5.

15. A process according to claim 1 in which the iodide solution resulting from the reduction of the iodate in the iodide-iodate solution to iodide with the amphoteric metal is acid to phenolphthalein indicator but alkaline to methyl orange indicator.

16. A process for preparing water-soluble iodides which comprises reacting elemental iodine with the aqueous solution of a water-soluble alkaline compound of a metal selected from the group consisting of alkali metals and alkaline earth metals in substantially stoichiometric proportions so as to produce a substantially neutral reaction mixture, and, without separation of reaction products from the reaction mixture, contacting said reaction mixture with an amphoteric metal selected from the group consisting of aluminum and zinc until substantially all the iodine employed in the reaction is in the form of iodide, and recovering the iodide.

17. A process according to claim 16 in which the water-soluble alkaline compound is the hydroxide.

18. A process according to claim 17 in which the iodide solution remaining after contact with the amphoteric metal is acid to phenolphthalein indicator but alkaline to methyl orange indicator.

19. A process according to claim 16 in which the pH of the iodide solution after contact with the amphoteric metal is adjusted to the range of minimum solubility of the amphoteric hydroxide, the precipitated amphoteric hydroxide separated from the solution, and the iodide recovered from the solution.

20. A process for preparing iodates and iodides which comprises reacting elemental iodine with a water-soluble hydroxide selected from the group consisting of the water-soluble alkali metal and alkaline earth metal hydroxides in substantially stoichiometric proportions so as to produce a substantially neutral reaction mixture and in sufficiently concentrated aqueous solution to precipitate a substantial quantity of the iodate formed in the reaction, reducing at least a portion of the iodate in the reaction mixture to iodide with an amphoteric metal selected from the group consisting of aluminum and zinc, and recovering the iodide.

21. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction, and in substantially stoichiometric proportions so as to produce a substantially neutral to only faintly alkaline reaction mixture, reducing at least a portion of the iodate in the reaction mixture to iodide with an amphoteric metal selected from the group consisting of aluminum and zinc, decomposing with an acid any dissolved amphoterate to precipitate amphoteric hydroxide, separating the solution from solid particles, and evaporating the solution directly to dryness to produce an iodide of U. S. P. purity.

References Cited in the file of this patent
UNITED STATES PATENTS

| | | |
|---|---|---|
| 964,156 | Graves | July 12, 1910 |
| 1,880,630 | Heimann et al. | Apr. 14, 1931 |
| 1,918,622 | Van der Meulen | July 18, 1933 |

OTHER REFERENCES

J. W. Mellor's "Modern Inorganic Chem.," pages 433 and 775, single vol. edition, January 1935, revised edition. Longmans, Green and Co., New York.

"Colloidal Iodine," by Wallace L. Chandler and Elroy J. Miller, J. Phys. Chem., vol. 31 (July 1927), pages 1091–1093.

J. W. Mellor's "A Comprehensive Treatise on Inorganic and Theoretical Chem.," vol. 2, 1922 ed., pages 332, 334, 596, 598, and vol. 5, page 207. Longmans, Green & Co., New York.